United States Patent Office 3,081,303
Patented Mar. 12, 1963

3,081,303
1-AMINOALKYL-α,α-DIPHENYLPIPERIDINE-
METHANOLS
Kurt J. Rorig, Glenview, Ill., assignor to G. D. Searle &
Co., Chicago, Ill., a corporation of Delaware
No Drawing. Filed Oct. 13, 1961, Ser. No. 144,828
9 Claims. (Cl. 260—247.5)

This invention relates to N-aminoalkyldiphenylpiperidylmethanes and carbinols, and to processes for the manufacture thereof. More particularly, this invention relates to compounds of the formula

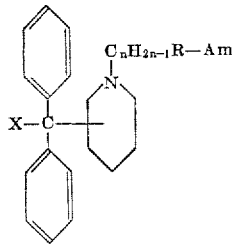

wherein X represents hydrogen or a hydroxy radical, $n$ represents a small positive integer, R represents hydrogen or a phenyl radical, and Am represents an optionally alkylated amino radical.

The application for Letters Patent securing the invention herein described and claimed is a continuation-in-part of applicant's prior copending application, Serial No. 813,339, filed May 15, 1959, and now abandoned.

Those skilled in the art will recognize that the term, $C_nH_{2n-1}R$, in the foregoing formula comprehends essentially lower alkylene and phenyl-substituted lower alkylene radicals, the phenyl constituent in the latter radicals having replaced hydrogen. Illustrative of lower alkylene radicals subject to phenyl substitution as aforesaid are methylene, ethylene, trimethylene, 1,2-propylene, tetramethylene, 2,2-dimethyl-1,3-propylene, 3-methyl-1,4-butylene, hexamethylene, and like bivalent saturated acyclic hydrocarbon groupings, among which those containing fewer than 4 carbon atoms are preferred.

Am in the generic formula for compounds of this invention subsumes both the primary amino radical, —NH₂, and secondary and most advantageously tertiary amino radicals resulting from the substitution of 1 or 2 alkyl radicals, respectively, for hydrogen therein—especially lower alkyl radicals, such as methyl, ethyl, propyl, butyl, isobutyl, sec-butyl, tert-butyl, pentyl, isopentyl, tert-pentyl, neopentyl, hexyl, isohexyl, etc. The alkyl groupings present when Am designates a tertiary amino radical may either be discrete, thus

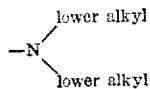

or they may be joined together directly or through oxygen or a second nitrogen atom to compose cyclic amino radicals optimally but not necessarily exclusively comprising at least 4 but not more than 8 carbon atoms as illustrated in the examples hereafter. Somewhat more broadly representative of the cyclic amino radicals contemplated by Am are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent 5- and 6-membered heterocyclic groupings. The terminal "ino" in the radical names set forth denotes attachment of the radicals thus characterized via nitrogen.

Equivalent to the basic amines of this invention for the purposes here described are non-toxic acid addition and quaternary ammonium salts thereof, the compositions of which may be symbolized by

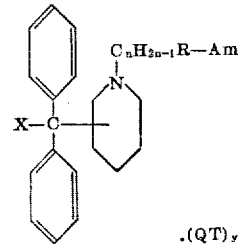

wherein X, $n$, R, and Am have the meanings hereinbefore assigned; Q is selected from among hydrogen and lower alkyl, hydroxy(lower alkyl), and lower alkenyl radicals, as also such aralkyl radicals as benzyl, phenylethyl, and naphthylmethyl; T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid, is neither pharmacologically nor otherwise undesirable in pharmaceutical dosage; and $y$ represents a positive integer less than 3.

The compounds to which this invention relates are useful because of their valuable and diverse pharmacological activity. They are spasmolytic, eurhythmic, and anti-inflammatory agents, and are further characterized by highly selective effects on the central nervous system—in particular, the potentiation of barbiturate-induced sleeping time.

Manufacture of the subject compositions proceeds by heating a diphenylpiperidylmethane or carbinol

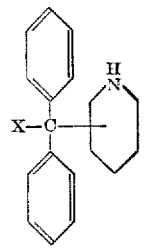

with an aminoalkyl halide of the formula $$Cl—C_nH_{2n-2}R—Am$$

(X, $n$, R, and Am being defined as before) in an inert solvent such as acetone, butanone, ethanol, chloroform, benzene, xylene, or the like, an acid acceptor such as potassium carbonate, pyridine, or triethylamine (i.e., an alkali carbonate or tertiary amine) being present if desired.

Conversion of the free bases of this invention to corresponding acid addition salts is accomplished by simple admixture thereof with 1 or 2 equivalents of any of various inorganic and strong organic acids, the anionic portion of which conforms to T as hereinbefore defined.

The quaternary ammonium compounds comprehended are those derived by contacting a claimed base with an organic ester of the formula $$Q—T$$

Q and T being limited by the meanings hereinabove assigned. Either 1 or 2 Q—T aggregates may be incorporated, quaternization taking place in the temperature range between 25 and 100° centigrade, there being present an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth temperatures are given in degrees centigrade, pressures in millimeters of mercury, and relative amounts of materials in parts by weight, except as otherwise noted.

EXAMPLE 1

*1 - (2 - dimethylaminoethyl) - α,α - diphenyl - 4 - piperidinemethanol dihydrochloride.*—A mixture of 43 parts of 2-dimethylaminoethyl chloride hydrochloride, 80 parts of α,α-diphenyl-4-piperidinemethanol, and 36 parts of powdered sodium carbonate in 50 parts of 95% ethanol is heated at the boiling point under reflux with vigorous agitation for 29 hours. Solvent is then removed by vacuum distillation and the residue partitioned between dilute hydrochloric acid and ether. The acidic phase is made basic with sodium hydroxide, and the resultant mixture is extracted with ether. Upon removal of solvent by distillation of the ether extract, there remains 1-(2-dimethylaminoethyl) - α,α - diphenyl - 4 - piperidinemethanol, which is converted to the desired salt by dissolution in ether and addition to the ether solution of just sufficient hydrogen chloride dissolved in 2-propanol to produce slight acidity. The salt precipitates and is isolated by filtration. Recrystallized from a mixture of ethanol and ether, the 1-(2-dimethylaminoethyl)-α,α-diphenyl-4-piperidinemethanol dihydrochloride thus obtained melts at approximately 266–267°. The product has the formula

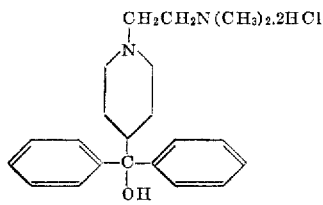

EXAMPLE 2

*1 - (2 - diethylaminoethyl) - α,α - diphenyl - 4 - piperidinemethanol dihydrobromide.*—A mixture of 41 parts of 2-diethylaminoethyl chloride, 80 parts of α,α-diphenyl-4-piperidinemethanol, and 36 parts of powdered sodium carbonate in 50 parts of 95% ethanol is heated at the boiling point under reflux with vigorous agitation for 29 hours. Removal of solvent by vacuum distillation, partitioning of the residue between dilute hydrochloric acid and ether, alkalization of the acidic phase with sodium hydroxide, extraction of the alkaline mixture with ether, and distillation of solvent from the ether extract affords as the residue, 1-(2-diethylaminoethyl)-α,α-diphenyl-4-piperidinemethanol. Conversion of this base to the dihydrobromide proceeds by dissolution in ether and addition to the ether solution of sufficient hydrogen bromide dissolved in ethanol to produce slight acidity. The 1-(2-diethylaminoethyl)-α,α-diphenyl-4-piperidinemethanol dihydrobromide thus formed precipitates and is isolated by filtration. Recrystallized from a mixture of ethanol and ether, the product melts at approximately 247–248°. It has the formula

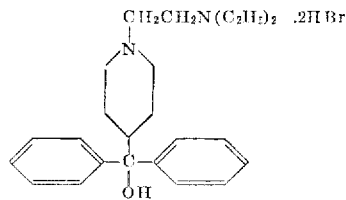

EXAMPLE 3

*1 - (2 - diisopropylaminoethyl) - α,α - diphenyl - 4-piperidinemethanol dihydrochloride ethanolate.*—Substitution of 60 parts of 2-diisopropylaminoethyl chloride hydrochloride for the 2-dimethylaminoethyl chloride hydrochloride called for in Example 1 affords, by the procedure there detailed, 1-(2-diisopropylaminoethyl)-α,α-diphenyl-4-piperidinemethanol dihydrochloride as the monoethanolate. The product melts at 210–212° (with gas evolution) and has the formula

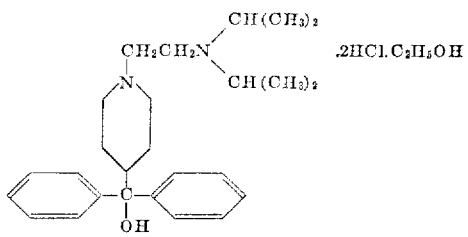

EXAMPLE 4

*1 - (3 - dimethylaminopropyl) - α,α - diphenyl - 4-piperidinemethanol dihydrobromide.*—Substituting 47 parts of 3-dimethylaminopropyl chloride for the 2-diethylaminoethyl chloride called for in Example 2 and using ethanol rather than a mixture of ethanol and ether as the recrystallization solvent, one obtains 1-(3-dimethylaminopropyl) - α,α - diphenyl - 4 - piperidinemethanol dihydrobromide melting at approximately 294–295° and having the formula

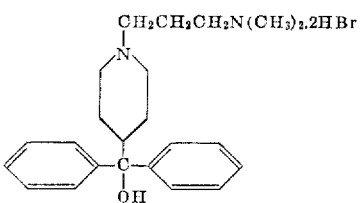

EXAMPLE 5

*1 - (3 - diethylaminopropyl) - α,α - diphenyl - 4 - piperidinemethanol dihydrobromide.*—Substitution of 55 parts of 3-diethylaminopropyl chloride hydrochloride for the 2-diethylaminoethyl chloride called for in Example 2 affords, by the procedure there detailed, 1-(3-diethylaminopropyl) - α,α - diphenyl - 4 - piperidinemethanol dihydrobromide melting at approximately 192° (with decomposition) and having the formula

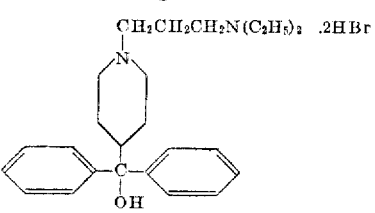

EXAMPLE 6

*1 - (1 - methyl - 2 - dimethylaminoethyl) - α,α - diphenyl - 4 - piperidinemethanol dihydrochloride.*—Substitution of 47 parts of 1-methyl-2-dimethylaminoethyl chloride hydrochloride for the 2-dimethylaminoethyl chloride hydrochloride called for in Example 1 affords, by the procedure there detailed, 1-(1-methyl-2-dimethylaminoethyl) - α,α - diphenyl - 4 - piperidinemethanol dihydrochloride melting at approximately 251° (with decomposition) and having the formula

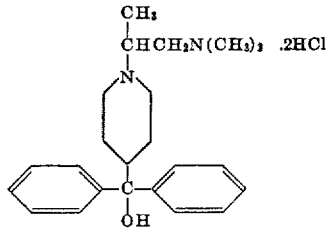

From the mother liquors, on addition of ether, there is precipitated the isomeric 1-(2-methyl-2-dimethylaminoethyl) - α,α - diphenyl - 4 - piperidinemethanol dihydrochloride.

EXAMPLE 7

*1 - (2 - diethylaminoethyl) - α,α - diphenyl - 2 - piperidinemethanol dihydrobromide.*—Substitution of 80 parts of α,α-diphenyl-2-piperidinemethanol for the α,α-diphenyl-4-piperidinemethanol called for in Example 2 affords, by the procedure there detailed, 1-(2-diethylaminoethyl)-α,α - diphenyl - 2 - piperidinemethanol dihydrobromide melting at approximately 229–230° (with decomposition) and having the formula

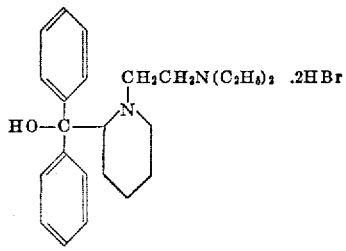

EXAMPLE 8

*1 - (2 - diethylaminoethyl) - α,α - diphenyl - 3 - piperidinemethanol dihydrobromide.*—Substitution of 80 parts of α,α-diphenyl-3-piperidinemethanol for the α,α-diphenyl-4-piperidinemethanol called for in Example 2 affords, by the procedure there detailed, 1(2-diethylaminoethyl)-α,α - diphenyl - 3 - piperidinemethanol dihydrobromide melting at approximately 203–204° (with gas evolution) and having the formula

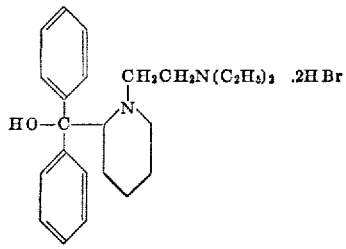

EXAMPLE 9

*α,α - Diphenyl - 1 - (2 - pyrrolidinoethyl) - 4 - piperidinemethanol dihydrochloride.*—Substitution of 41 parts of 2-pyrrolidinoethyl chloride for the 2-dimethylaminoethyl chloride hydrochloride called for in Example 1 affords, by the procedure there detailed, α,α-diphenyl-1-(2 - pyrrolidinoethyl) - 4 - piperidinemethanol dihydrochloride melting at approximately 327–328° (with decomposition) and having the formula

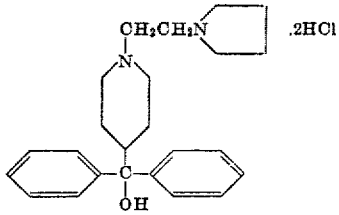

EXAMPLE 10

*1-[2-(2-methylpyrrolidino)ethyl] - α,α - diphenyl.* — A mixture of 54 parts of 2-(2-methylpyrrolidino)ethyl chloride hydrochloride, 80 parts of α,α-diphenyl-4-piperidinemethanol, and 36 parts of powdered sodium carbonate in 50 parts of 95% ethanol is heated at the boiling point under reflux with vigorous agitation for 24 hours. Solvent is then removed by vacuum distillation and the residue partitioned between dilute hydrochloric acid and ether. The acidic phase is made basic with sodium hydroxide, and the resultant mixture is extracted with ether. Upon removal of solvent by distillation of the ether extract, there remains 1-[2-(2-methylpyrrolidino)ethyl]-α,α-diphenyl-4-piperidinemethanol, of the formula

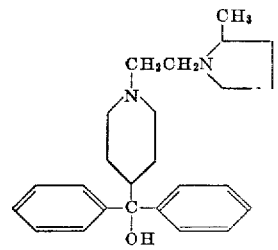

EXAMPLE 11

*1-[2-(2,2-dimethylpyrrolidino)ethyl] - α,α - diphenyl-4-piperidinemethanol.*—Substitution of 59 parts of 2-(2,2-dimethylpyrrolidino)ethyl chloride hydrochloride for the 2 - (2 - methylpyrrolidino)ethyl chloride hydrochloride called for in Example 10 affords, by the procedure there detailed, 1-[2-(2,2 - dimethylpyrrolidino)ethyl] - α,α-diphenyl-4-piperidinemethanol, of the formula

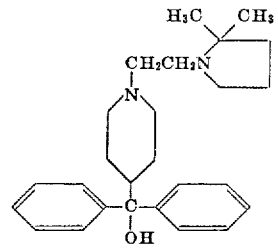

EXAMPLE 12

*1-[2-(2,4-dimethylpyrrolidino)ethyl] - α,α - diphenyl-4-piperidinemethanol.*—Substitution of 59 parts of 2-(2,4-dimethylpyrrolidino)ethyl chloride hydrochloride for the 2 - (2 - methylpyrrolidino)ethyl chloride hydrochloride called for in Example 10 affords, by the procedure there detailed, 1-[2 - (2,4 - dimethylpyrrolidino)ethyl]-α,α-diphenyl-4-piperidinemethanol, of the formula

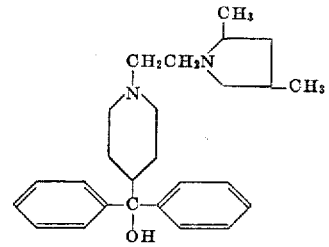

EXAMPLE 13

*1-[2 - (2,5 - dimethylpyrrolidino)ethyl]-α,α-diphenyl-4-piperidinemethanol dihydrochloride.*—Substitution of 59 parts of 2-(2,5-dimethylpyrrolidino)ethyl chloride hydrochloride for the 2-dimethylaminoethyl chloride hydrochloride called for in Example 1 affords, by the procedure there detailed, 1-[2-(2,5-dimethylpyrrolidino)ethyl]-α,α-diphenyl-4-piperidinemethanol dihydrochloride, melting at approximately 257° (with gas evolution) and having the formula

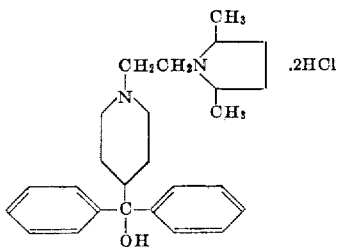

EXAMPLE 14

*1-[2-(2,2,4-trimethylpyrrolidino)ethyl] - α,α - diphenyl-4-piperidinemethanol.*—Substitution of 64 parts of 2-(2,2,4-trimethylpyrrolidino)ethyl chloride hydrochloride for the 2-(2-methylpyrrolidino)ethyl chloride hydrochloride called for in Example 10 affords, by the procedure there detailed, 1-[2-(2,2,4 - trimethylpyrrolidino)ethyl]-α,α-diphenyl-4-piperidinemethanol, of the formula

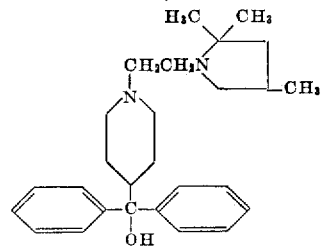

EXAMPLE 15

*α,α-Diphenyl - 1-(2-piperidinoethyl)-4-piperidinemethanol.*—Substitution of 54 parts of 2-piperidinoethyl chloride hydrochloride for the 2-(2-methylpyrrolidino)ethyl chloride hydrochloride called for in Example 10 affords, by the procedure there detailed, α,α-diphenyl-1-(2-piperidinoethyl)-4-piperidinemethanol, of the formula

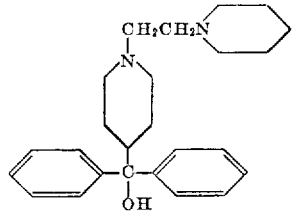

EXAMPLE 16

*1-[2-(2-methylpiperidino)ethyl] - α,α-diphenyl-4-piperidinemethanol.*—Substitution of 59 parts of 2-(2-methylpiperidino)ethyl chloride hydrochloride for the 2-(2-methylpyrrolidino)ethyl chloride hydrochloride called for in Example 10 affords, by the procedure there detailed, 1-[2-(2-methylpiperidino)ethyl]-α,α-diphenyl - 4 - piperidinemethanol, of the formula

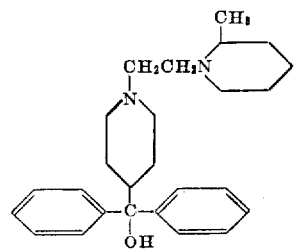

EXAMPLE 17

*1-[2-(2,6 - dimethylpiperidino)ethyl] - α,α - diphenyl-4-piperidinemethanol.*—Substitution of 60 parts of 2-(2,6-dimethylpiperidino)ethyl chloride hydrochloride for the 2 - (2 - methylpyrrolidino)ethyl chloride hydrochloride called for in Example 10 affords, by the procedure there detailed, 1-[2 - (2,6 - dimethylpiperidino)ethyl] - α,α-diphenyl-4-piperidinemethanol, of the formula

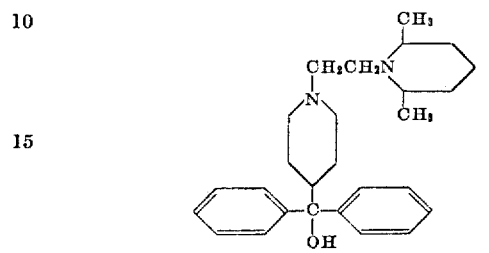

EXAMPLE 18

*1-[2-(5-ethyl-2-methylpiperidino)ethyl] - α,α-diphenyl-4-piperidinemethanol.*—Substitution of 67 parts of 2-(5-ethyl - 2 - methylpiperidino)ethyl chloride for the 2-(2-methylpyrrolidino)ethyl chloride hydrochloride called for in Example 10 affords, by the procedure there detailed, 1-[2-(5-ethyl-2-methylpiperidino)-ethyl] - α,α - diphenyl-4-piperidinemethanol, of the formula

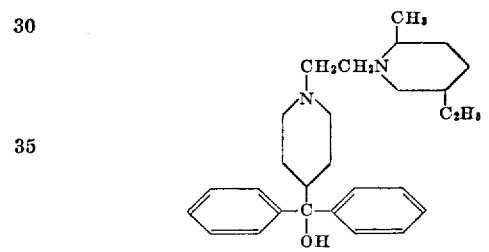

EXAMPLE 19

*1-(2-morpholinoethyl) - α,α - diphenyl - 4 - piperidinemethanol dihydrochloride.*—Substituting 56 parts of 2-morpholinoethyl chloride hydrochloride for the 2-dimethylaminoethyl chloride hydrochloride called for in Example 1 and using ethanol rather than a mixture of ethanol and ether as the recrystallization solvent, one obtains 1-(2-morpholinoethyl) - α,α-diphenyl-4-piperidinemethanol dihydrochloride melting at approximately 303–304° (with decomposition) and having the formula

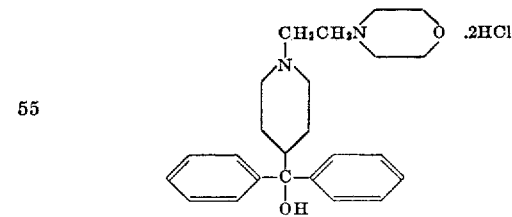

EXAMPLE 20

*(A) α,α-Diphenyl-1-(1 - phenyl-2-pyrrolidinoethyl)-4-piperidinemethanol dihydrochloride.*—A mixture of 74 parts of 1-phenyl-2-pyrrolidinoethyl chloride hydrochloride, 80 parts of α,α-diphenyl-4-piperidinemethanol, and 36 parts of powdered sodium carbonate in 60 parts of 95% ethanol is heated at the boiling point under reflux for 72 hours. Solvent is then removed by vacuum distillation and the residue partitioned between dilute hydrochloric acid and ether. The acidic phase is made basic with sodium hydroxide, and the resultant mixture is extracted with ether. Upon removal of solvent by distillation, there remains a "glass" which is taken up in 150 parts of hot ethanol. The ethanol solution is acidified with hydrogen chloride dissolved in 2-propanol. Upon cooling and standing of the resultant solution, α,α-diphenyl-1-(1-phenyl-2-pyrrolidinoethyl)-4-piperidinemethanol dihydrochloride precipitates as a white granular solid which is recovered from the mother liquors by filtration. The product melts at approximately 278–279° (with decomposition) and has the formula

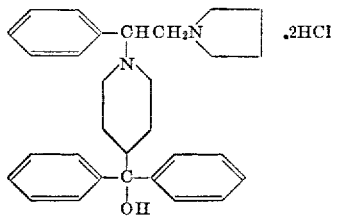

(B) *α,α-Diphenyl-1-(2 - phenyl - 2 - pyrrolidinoethyl)-4 - piperidinemethanol dihydrochloride.* — The alcoholic mother liquors deriving from precipitation of α,α-diphenyl-1-(1-phenyl-2-pyrrolidinoethyl) - 4-piperidinemethanol dihydrochloride in Part A of this example are heated to boiling and diluted thereat with 600 parts of ether. Upon chilling of the resultant solution, there precipitates α,α-diphenyl-1-(2-phenyl-2-pyrrolidinoethyl) - 4 - piperidinemethanol dihydrochloride. Recovered by filtration and recrystallized from a mixture of ethanol and ether, the product is obtained as fluffy long needles melting at 258–260° (with decomposition). It has the formula

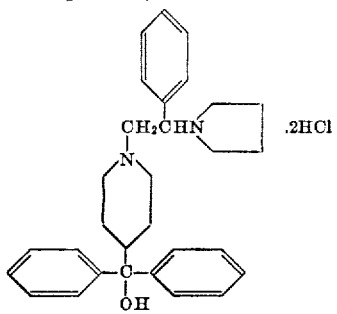

What is claimed is:
1. A compound of the formula

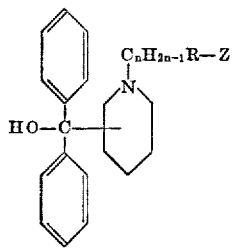

wherein
(a) $n$ is a positive integer less than 4;
(b) R is selected from the group consisting of hydrogen and the phenyl radical, —$C_6H_5$; and
(c) Z is selected from the group consisting of radicals of the formulas —N(lower alkyl)$_2$    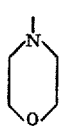    

in which Alk is selected from the group consisting of alkylene radicals of the formulas —$CH_2CH_2CH_2CH_2$—
—$CH(CH_3)CH_2CH_2CH_2$—
—$C(CH_3)_2CH_2CH_2CH_2$—
—$CH(CH_3)CH_2CH(CH_3)CH_2$—
—$CH(CH_3)CH_2CH_2CH(CH_3)$—
—$CH_2CH_2CH_2CH_2CH_2$—
—$CH(CH_3)CH_2CH_2CH_2CH_2$—
—$CH(CH_3)CH_2CH_2CH_2CH(CH_3)$—
—$CH(CH_3)CH_2CH_2CH(C_2H_5)CH_2$—
—$C(CH_3)_2CH_2CH(CH_3)CH_2$—

2. A compound of the formula

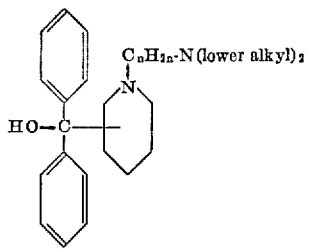

wherein $n$ is a positive integer less than 4.
3. 1-(2-dimethylaminoethyl)-α,α-diphenyl-2-piperidinemethanol.
4. A compound of the formula

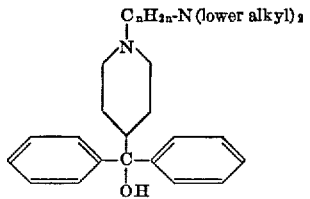

wherein $n$ is a positive integer less than 4.
5. 1-(2-diethylaminoethyl)-α,α-diphenyl-4 - piperidinemethanol.
6. α,α-diphenyl-1-(2-pyrrolidinoethyl) - 4 - piperidine methanol.
7. A compound of the formula

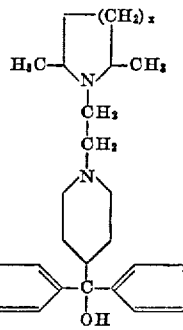

wherein $x$ is a positive integer less than 3.
8. 1-(2-morpholinoethyl)-α,α-diphenyl - 4 - piperidinomethanol.
9. A compound of the formula

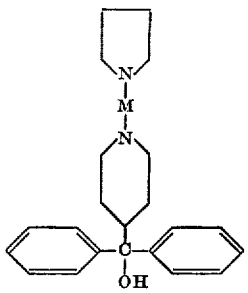

wherein M is a radical of the formula

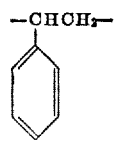

No references cited.

UNITED STATES PATENT OFFICE
CERTIFICATE OF CORRECTION

Patent No. 3,081,303                                    March 12, 1963

Kurt J. Rorig

It is hereby certified that error appears in the above numbered patent requiring correction and that the said Letters Patent should read as corrected below.

Column 5, line 3, after "aminoethyl" insert a closing parenthesis; line 51, for "1(2-" read -- 1-(2- --; column 6, line 14, for "diphenyl.", in italics, read -- diphenyl-4-piperidinemethanol. --, in italics; column 8, line 27, for "2-methylpiperidino)-ethyl]" read -- 2-methylpiperidino)ethyl] --.

Signed and sealed this 25th day of February 1964.

(SEAL)
Attest:
ERNEST W. SWIDER                                EDWIN L. REYNOLDS Attesting Officer                                   Acting Commissioner of Patents